(12) United States Patent
Shinagawa

(10) Patent No.: US 11,014,227 B2
(45) Date of Patent: May 25, 2021

(54) DRIVE DEVICE INCLUDING PLURALITY OF MOTORS CONFIGURED TO DRIVE ONE OPERATION SHAFT, AND ROBOT INCLUDING DRIVE DEVICE

(71) Applicant: FANUC CORPORATION, Yamanashi (JP)

(72) Inventor: Masahide Shinagawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 227 days.

(21) Appl. No.: 16/395,446

(22) Filed: Apr. 26, 2019

(65) Prior Publication Data

US 2019/0344437 A1    Nov. 14, 2019

(30) Foreign Application Priority Data

May 10, 2018  (JP) .............................. JP2018-091553

(51) Int. Cl.
   *B25J 9/04*     (2006.01)
   *F16D 63/00*    (2006.01)
   *F16D 71/04*    (2006.01)

(52) U.S. Cl.
   CPC .............. *B25J 9/04* (2013.01); *F16D 63/002* (2013.01); *F16D 71/04* (2013.01)

(58) Field of Classification Search
   CPC . F16D 63/002; F16D 71/04; B25J 9/04; B25J 19/0004
   See application file for complete search history.

(56) References Cited

U.S. PATENT DOCUMENTS

| 4,717,303 A | * | 1/1988 | Kawai | B25J 9/0006 |
| | | | | 414/1 |
| 4,964,503 A | * | 10/1990 | Nishiyama | B25J 9/104 |
| | | | | 192/12 D |
| 2009/0145699 A1 | * | 6/2009 | Jonsson | B25J 19/0004 |
| | | | | 188/1.11 L |

(Continued)

FOREIGN PATENT DOCUMENTS

| JP | H09040339 A | 2/1997 |
| JP | 200855550 A | 3/2008 |

OTHER PUBLICATIONS

English Abstract and Machine Translation for Japanese Publication No. JPH09-040339 A, published Feb. 10, 1997, 15 pgs.

(Continued)

*Primary Examiner* — William Kelleher
*Assistant Examiner* — Gregory T Prather
(74) *Attorney, Agent, or Firm* — Fredrikson & Byron, P.A.

(57) ABSTRACT

A drive device capable of allowing a brake operation of a braking mechanism of the drive device to suppress a mechanical load applied to a mechanism unit (i.e., a robot mechanical section) provided with the drive device. The drive device includes a first braking mechanism provided in a first motor to execute a first brake operation on an operation shaft, a second braking mechanism provided in a second motor to execute a second brake operation on the operation shaft, and a brake controller configured to control the first braking mechanism and the second braking mechanism to allow the first brake operation and the second brake operation to be continuously executed after starting the first brake operation before starting the second brake operation.

4 Claims, 8 Drawing Sheets

(56) References Cited

U.S. PATENT DOCUMENTS

| | | | | |
|---|---|---|---|---|
| 2013/0039730 A1* | 2/2013 | Sueyoshi | ............... | B25J 9/042 414/685 |
| 2014/0137687 A1* | 5/2014 | Nogami | ............... | B25J 19/0004 74/490.03 |
| 2014/0216867 A1* | 8/2014 | Yasuda | ............... | F16D 55/28 188/163 |
| 2015/0258681 A1* | 9/2015 | Kinoshita | ............... | B25J 19/0004 74/490.03 |
| 2015/0330418 A1* | 11/2015 | Yamaguchi | ............... | F15B 15/26 188/158 |
| 2015/0345571 A1* | 12/2015 | Yi | ............... | F16D 27/14 188/164 |
| 2017/0182655 A1* | 6/2017 | Shinagawa | ............... | F16H 57/02 |
| 2017/0274540 A1* | 9/2017 | Funakubo | ............... | B25J 19/06 |
| 2018/0298981 A1* | 10/2018 | Kagata | ............... | F16F 15/002 |
| 2019/0238070 A1* | 8/2019 | Fujii | ............... | F16D 66/021 |
| 2021/0028727 A1* | 1/2021 | Tan | ............... | B25J 19/0004 |

OTHER PUBLICATIONS

English Abstract and Machine Translation for Japanese Publication No. 2008-055550 A, published Mar. 13, 2008, 11 pgs.

\* cited by examiner

DRIVE DEVICE INCLUDING PLURALITY OF MOTORS CONFIGURED TO DRIVE ONE OPERATION SHAFT, AND ROBOT INCLUDING DRIVE DEVICE

BACKGROUND OF THE INVENTION

1. Field of the Invention

The invention relates to a drive device including a plurality of motors configured to cooperate to drive one operation shaft, and a robot including the drive device.

2. Description of the Related Art

There is a known braking mechanism of a drive device (so-called tandem drive device) including a plurality of motors configured to cooperate to drive one operation shaft (e.g., JP 2008-055550 A).

In the related art, it is required to cause a brake operation of a braking mechanism of a drive device to suppress a mechanical load applied to a mechanism unit (e.g., a robot mechanical section) provided with the drive device.

SUMMARY OF THE INVENTION

In an aspect of the present disclosure, a drive device, in which a plurality of motors cooperate to drive one operation shaft, includes a first motor and a second motor; a first braking mechanism provided at a first motor and configured to carry out a first brake operation on the operation shaft; a second braking mechanism provided at a second motor and configured to carry out a second brake operation on the operation shaft; and a brake controller configured to control the first braking mechanism and the second braking mechanism so as to continue the first brake operation and the second brake operation after starting the first brake operation prior to the second brake operation.

The present disclosure allows the first brake operation and the second brake operation to disperse a peak of a load applied to a mechanism unit, reducing each peak in size, resulting in a reduction in the load when the first braking mechanism and the second braking mechanism operate.

DETAILED DESCRIPTION

Figure 1:
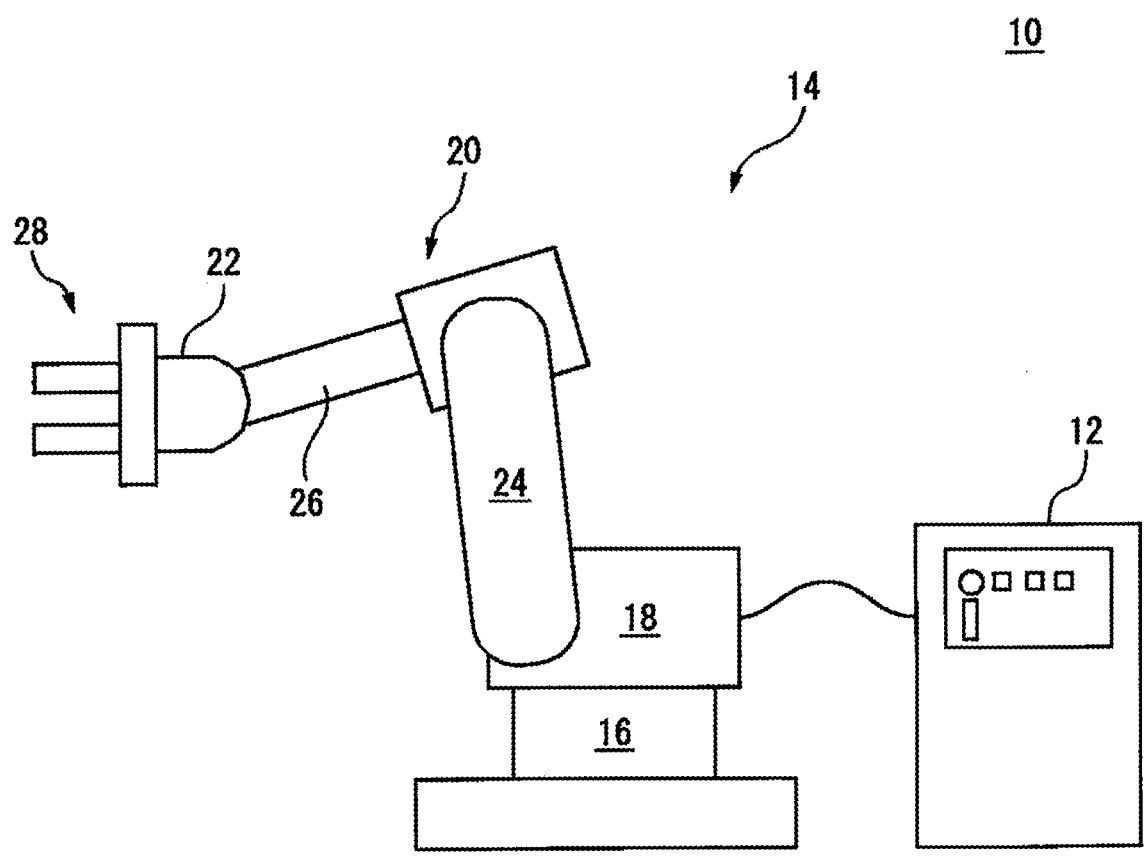
FIG. 1 is a view of a robot according to one embodiment.

Embodiments of the present disclosure will be described in detail below with reference to the drawings. Note that, in the various embodiments to be described below, the same reference numerals are given to similar components, and redundant descriptions thereof will be omitted. First, a robot 10 according to one embodiment is described with reference to FIGS. 1 and 2.

Figure 2:
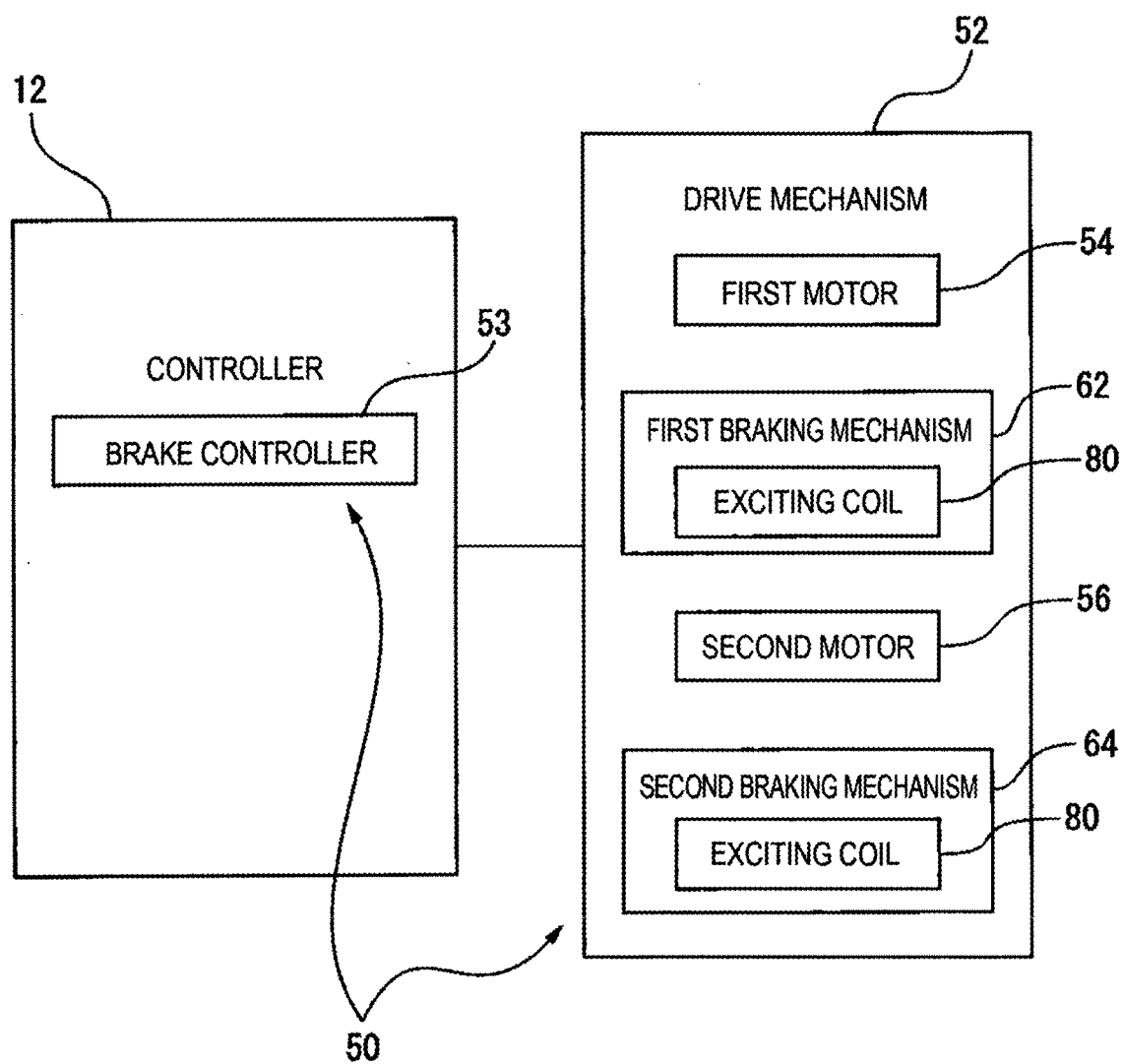
FIG. 2 is a block diagram of the robot illustrated in FIG. 1.

The robot 10 includes a controller 12, a robot mechanical section 14, and a drive device 50 (FIG. 2). The controller 12 includes e.g. a processor and storage, and is configured to control the robot mechanical section 14 and the drive device 50.

In the present embodiment, the robot mechanical section 14 includes a base 16, a rotary barrel 18, a robot arm 20, and a wrist 22. The base 16 is fixed on a floor of a work cell. The rotary barrel 18 is mounted to the base 16 so as to be rotatable about the vertical axis. The robot arm 20 includes a lower arm 24 rotatably coupled to the rotary barrel 18 and an upper arm 26 rotatably coupled to a distal end of the lower arm 24.

The wrist 22 is rotatably provided at a distal end of the upper arm 26. An end effector 28 is detachably attached to the wrist 22. The end effector 28 is e.g. a robot hand, a welding gun, or a paint applicator.

Figure 3:
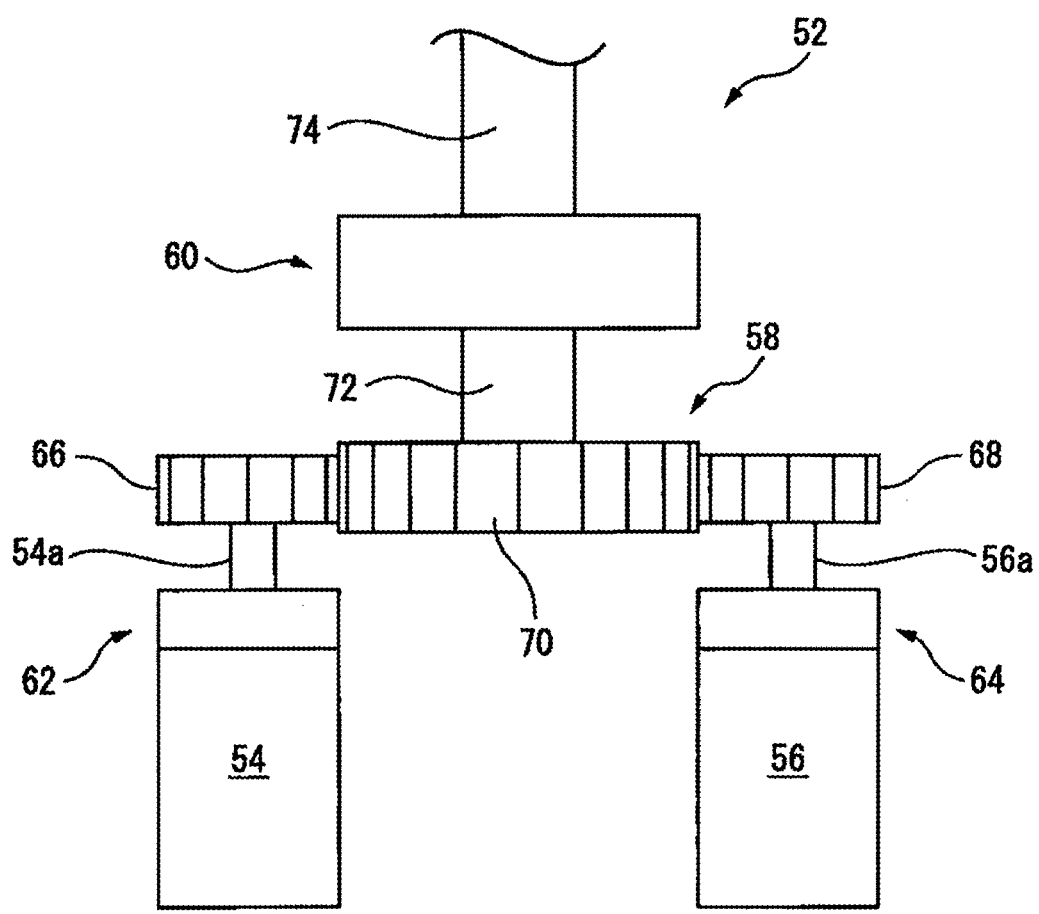
FIG. 3 is a view of a drive mechanism configured to drive a robot mechanical section illustrated in FIG. 1.

The drive device 50 is configured to drive to rotate an articulated shaft 74 (FIG. 3) of a movable element (i.e., the rotary barrel 18, the lower arm 24, the upper arm 26, or the wrist 22) of the robot mechanical section 14. Hereinafter, the drive device 50 will be described with reference to FIGS. 2 and 3.

The drive device 50 includes a drive mechanism 52 and a brake controller 53. In the present embodiment, the brake controller 53 is incorporated in the controller 12, and the controller 12 functions as the brake controller 53. The function of the brake controller 53 will be described below.

The drive mechanism 52 includes a first motor 54, a second motor 56, an input gear stage 58, a speed reducer 60, a first braking mechanism 62, and a second braking mechanism 64. The first motor 54 is e.g. a servomotor, and includes an output shaft 54a. The first motor 54 is configured to rotate its output shaft 54a in response to a command from the controller 12. A gear 66 is fixedly provided at a distal end of the output shaft 54a.

Similarly to the first motor 54, the second motor 56 is e.g. a servomotor, and includes an output shaft 56a. The second motor 56 is configured to rotate its output shaft 56a in response to a command from the controller 12. A gear 68 is fixedly provided at a distal end of the output shaft 56a.

The input gear stage 58 includes an input gear 70 engaging the gears 66 and 68, and an input shaft 72 extending from the input gear 70. The input gear stage 58 is rotated along with the rotation of the gears 66 and 68.

The speed reducer 60 has a multi-stage gear structure (not illustrated) built therein, and the input shaft 72 of the input gear stage 58 is coupled to the input side of the speed reducer 60, while an articulated shaft 74 as an operation shaft is coupled to the output side of the speed reducer 60. The speed reducer 60 transmits a rotation of the input shaft 72 to the articulated shaft 74 while decelerating the rotation. The articulated shaft 74 is fixedly coupled to the movable element (the rotary barrel 18, the lower arm 24, the upper arm 26, or the wrist 22) of the robot mechanical section 14.

If the first motor 54 and the second motor 56 rotate the output shafts 54a and 56a respectively, rotational force of the output shafts 54a and 56a are transmitted to the articulated shaft 74 via the input gear stage 58 and the speed reducer 60 so as to rotate the articulated shaft 74 (i.e., the movable element) in one direction. Thus, in the drive mechanism 52 the plurality of motors 54 and 56 cooperate to drive one articulated shaft 74 in the same direction (so-called, tandem drive).

For example, if the drive mechanism 52 is provided to drive the lower arm 24 to rotate relative to the rotary barrel 18, the first motor 54 and the second motor 56 are fixed relative to the lower arm 24, and cooperate with each other to drive the articulated shaft 74 fixedly coupled to the rotary barrel 18 in the same direction.

The first braking mechanism 62 is provided at the first motor 54 while the second braking mechanism 64 is provided at the second motor 56. The first braking mechanism 62 and the second braking mechanism 64 are each configured to carry out a brake operation on the articulated shaft 74. In the present embodiment, the first braking mechanism 62 and the second braking mechanism 64 have the same configuration.

Hereinafter, the configurations of the first braking mechanism 62 and the second braking mechanism 64 will be described with reference to FIG. 4. Note that, in the following description, an axial direction corresponds to a direction along an axis O of the output shaft 54a (or the output shaft 56a), a radial direction corresponds to a radial direction of a circle centered about the axis O, and a circumferential direction corresponds to a circumferential direction of the circle.

The first braking mechanism 62 is configured to directly brake the output shaft 54a of the first motor 54. Specifically, the first braking mechanism 62 includes a brake core 76, an exciting coil 78, a biasing member 80, an armature 82, an end plate 84, and a brake disc 86.

The brake core 76 is an annular member made from a magnetic material, such as iron, etc., and is disposed to be centered about the axis O. The brake core 76 is formed with an annular first recess 76a, and an annular second recess 76b disposed radially inside of the first recess 76a. Each of the first recess 76a and the second recess 76b is formed to be recessed from an axial end face 76c of the brake core 76.

The exciting coil 78 is housed in the first recess 76a of the brake core 76, and wound in the circumferential direction. The exciting coil 78 is electrically connected to a brake power source (not illustrated) externally installed. The controller 12 transmits a command to the brake power source so as to apply voltage to the exciting coil 78 to excite the brake core 76, and cancel the excitation.

The biasing member 80 is housed in the second recess 76b of the brake core 76. The biasing member 80 includes an elastic member, such as a coil spring, etc., and urges the armature 82 in a direction toward the brake disc 86.

The armature 82 is an annular member made from a magnetic material, and disposed to be centered about the axis O. The armature 82 is provided movable in the axial direction so as to selectively contact and separate from the brake disc 86. The armature 82 is disposed adjacent to the end face 76c of the brake core 76.

The end plate 84 is an annular member disposed to be centered about the axis O, and is disposed at a position spaced apart from the armature 82 in the axial direction. The end plate 84 is fixed to the brake core 76 by fasteners 88 such as bolts.

The brake disc 86 is an annular member disposed to be centered about the axis O, and is provided on an outer circumferential surface of the output shaft 54a so as to be immovable in the circumferential direction relative to the output shaft 54a, whereby the brake disc 86 rotates integrally with the output shaft 54a. The brake disc 86 is disposed between the armature 82 and the end plate 84.

The second braking mechanism 64 is configured to directly brake the output shaft 56a of the second motor 56. Similarly to the first braking mechanism 62, the second braking mechanism 64 includes the brake core 76, the exciting coil 78, the biasing member 80, the armature 82, the end plate 84, and the brake disc 86 provided immovable in the circumferential direction relative to the output shaft 56a.

When deactivating the braking mechanism 62, 64, the controller 12 transmits a command to an externally installed brake power source so as to apply voltage to the exciting coil 78. Due to this, the exciting coil 78 and the brake core 76 are excited to cause a magnetic force to attract the armature 82 toward the brake core 76. As a result, the armature 82 is moved toward the brake core 76 against the biasing force of the biasing member 80, and attracted onto the end face 76c of the brake core 76.

Figure 4:
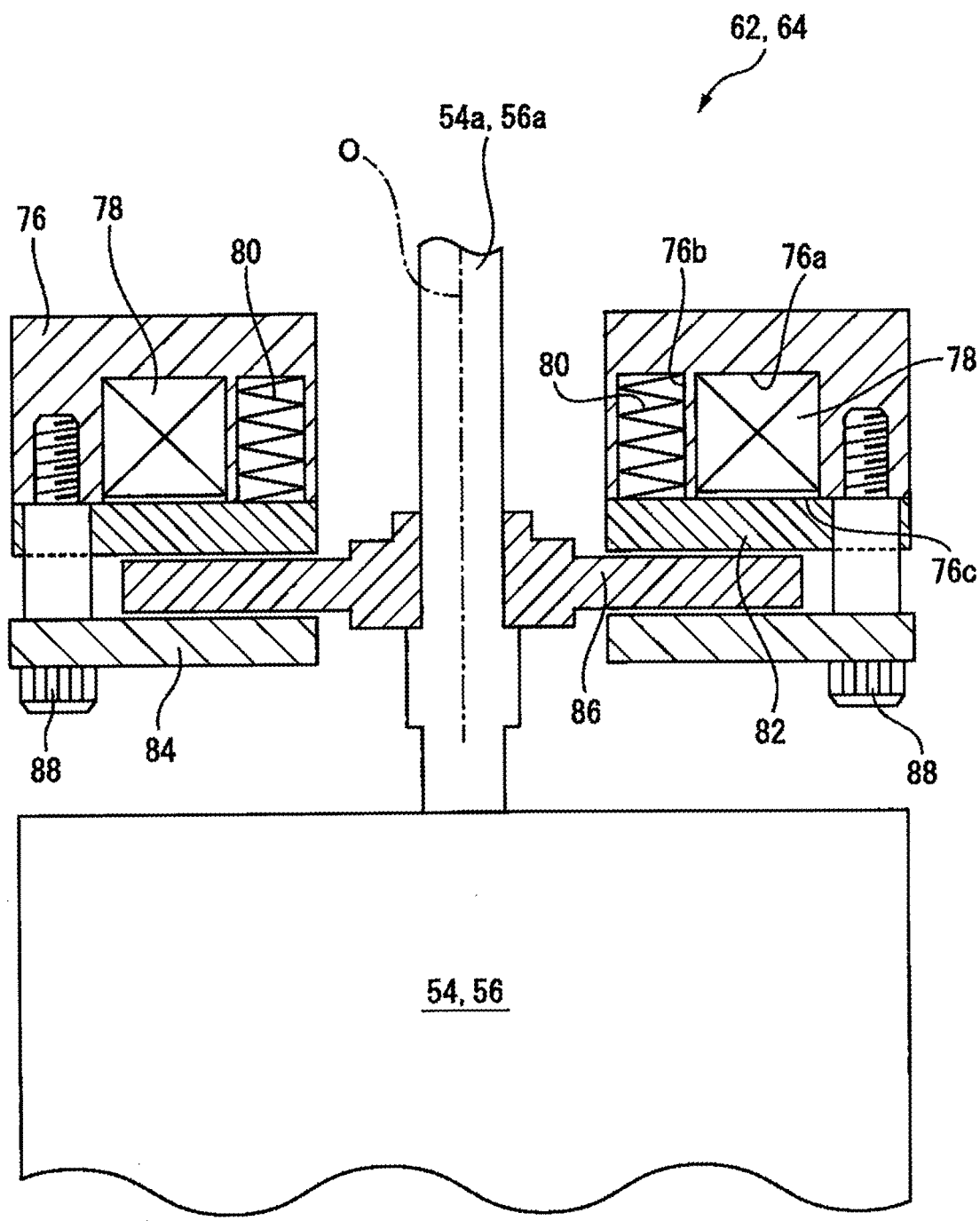
FIG. 4 is a view of first and second braking mechanisms illustrated in FIG. 3, illustrating a state where operations of the first and second braking mechanisms are released.

This state is illustrated in FIG. 4. As illustrated in FIG. 4, in a state where the braking mechanism 62, 64 is deactivated, the armature 82 comes into contact with the end face 76c of the brake core 76, while separating away from the brake disc 86. Due to this, the brake disc 86 is rotatable in the circumferential direction, and thus the braking on the output shaft 54a, 56a by the braking mechanism 62, 64 is cancelled.

On the other hand, when activating the braking mechanism 62, 64, the controller 12 transmits a command to the brake power source so as to stop applying the voltage to the exciting coil 78. Due to this, the excitation of the exciting coil 78 and the brake core 76 is canceled, whereby the magnetic force attracting the armature 82 toward the brake core 76 is lost.

As a result, the armature 82 is moved in the direction toward the brake disc 86 by the action of the biasing member 80 so as to be pressed against the brake disc 86, whereby the brake disc 86 is held between the armature 82 and the end plate 84. This state is illustrated in FIG. 5.

Figure 5:
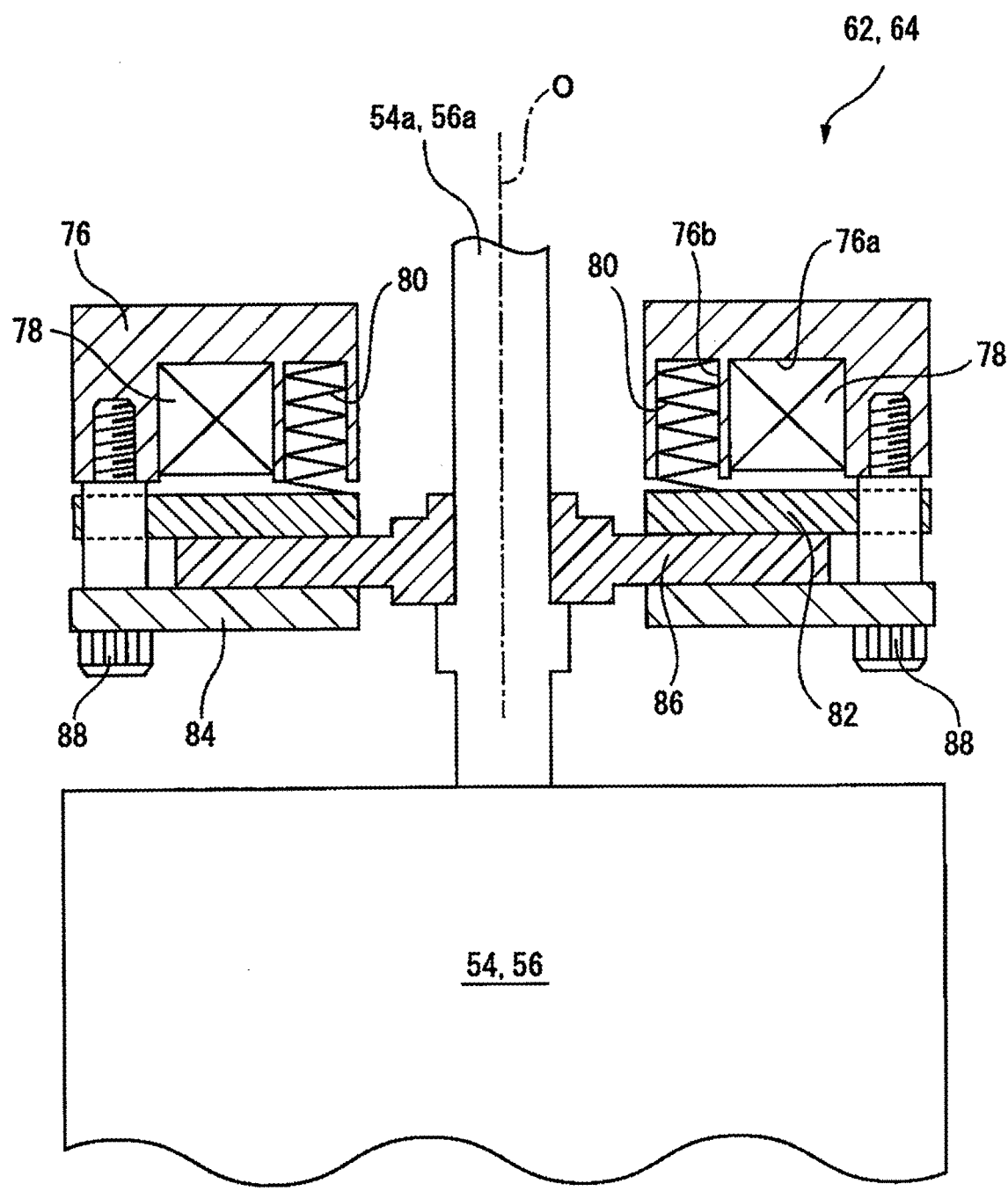
FIG. 5 is a view of a state where first and second braking mechanisms illustrated in FIG. 4 are in operation.

As illustrated in FIG. 5, in a state where the braking mechanism 62, 64 is activated, the brake disc 86 is held between the armature 82 and the end plate 84 by the biasing force of the biasing member 80 so as to brake the rotation of the brake disc 86 in the circumferential direction, whereby braking the rotation of the output shafts 54a and 56a. As a result, the articulated shaft 74, which is mechanically coupled to the output shafts 54a and 56a, is also braked by the braking mechanisms 62 and 64.

In the present embodiment, when stopping the articulated shaft 74, the controller 12 controls the first braking mechanism 62 and the second braking mechanism 64 so as to continue a first brake operation of the first braking mechanism 62 and a second brake operation of the second braking mechanism 64 after starting the first brake operation prior to the second brake operation. Thus, in the present embodiment, the controller 12 functions as the brake controller 53 configured to control the first braking mechanism 62 and the second braking mechanism 64.

Figure 6:
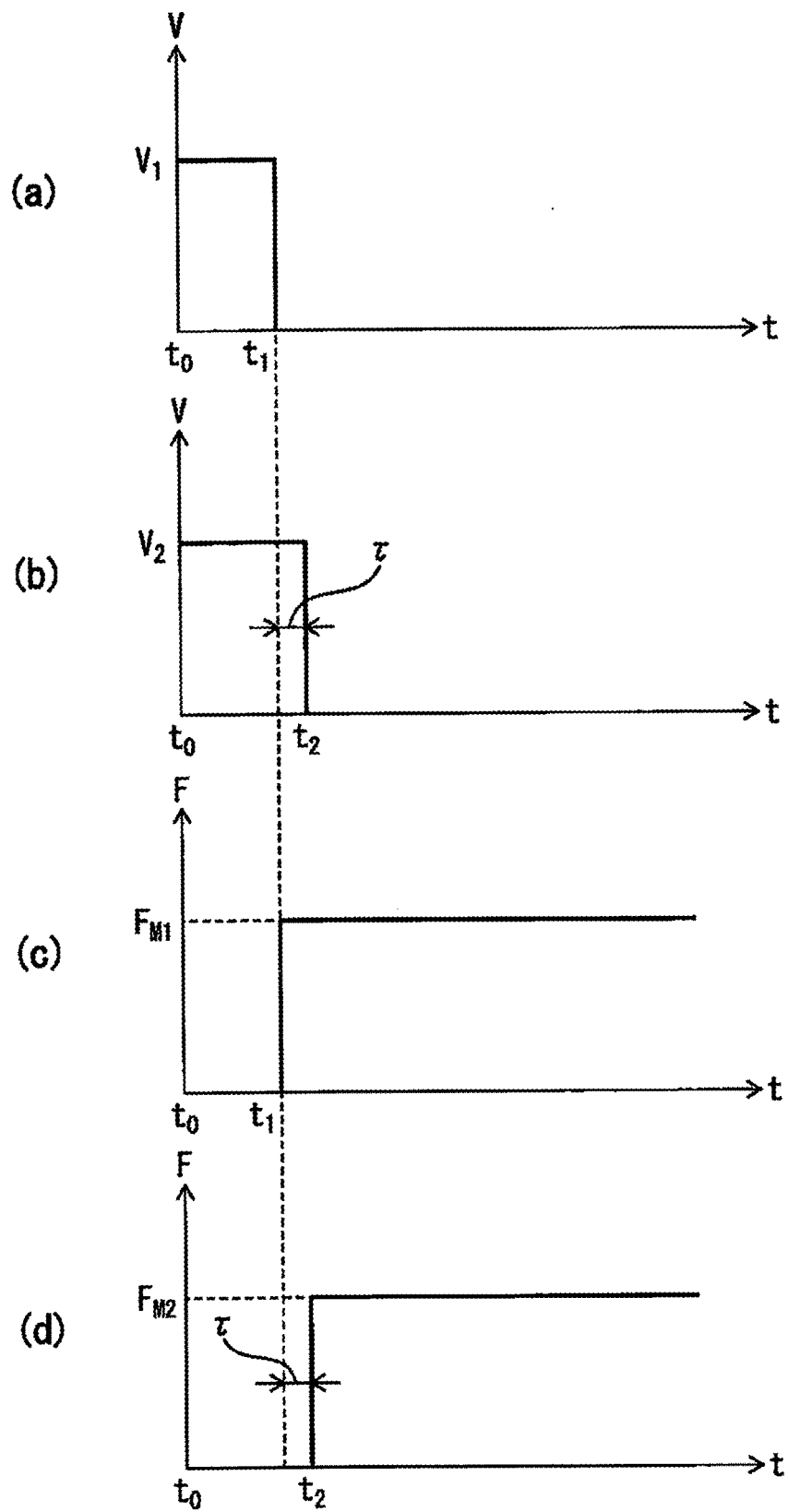
FIG. 6 shows graphs for explaining timings of a first brake operation of a first braking mechanism and a second brake operation of a second braking mechanism.

Hereinafter, timings of the first brake operation of the first braking mechanism 62 and the second brake operation of the second braking mechanism 64 will be described with reference to FIG. 6. Section (a) in FIG. 6 shows a graph of the relationship between voltage V applied to the exciting coil 78 of the first braking mechanism 62 and time t, and section (b) in FIG. 6 shows a graph of the relationship between voltage V applied to the exciting coil 78 of the second braking mechanism 64 and time t. Further, section (c) in FIG. 6 shows a graph of the relationship between braking force F of the first braking mechanism 62 and time t, and section (d) in FIG. 6 shows a graph of the relationship between braking force F of the second braking mechanism 64 and time t.

At the time point $t_0$, the first braking mechanism 62 and the second braking mechanism 64 are deactivated. That is, voltages $V_1$ and $V_2$ are applied from the brake power source to the exciting coils 78 of the first braking mechanism 62 and the second braking mechanism 64, respectively, and the armatures 82 of the first braking mechanism 62 and the second braking mechanism 64 are attracted onto the end faces 76c of the brake cores 76 (FIG. 4).

When stopping the articulated shaft 74, the controller 12 firstly starts the first brake operation of the first braking mechanism 62 at the time point $t_1$. More specifically, the controller 12 transmits a command to the external brake power source at the time point $t_1$ so as to control the voltage V applied to the exciting coil 78 of the first braking mechanism 62 from $V_1$ to zero, as illustrated in section (a) in FIG. 6.

As a result, the excitation of the exciting coil 78 of the first braking mechanism 62 is canceled, whereby the brake disc 86 is held between the armature 82 and the end plate 84 (FIG. 5). In this way, as illustrated in section (c) in FIG. 6, the first braking mechanism 62 applies maximum braking force $F_{M1}$ to the output shaft 54a of the first motor 54 at the time point $t_1$ (in a precise sense, after a small amount of time has elapsed from the time point $t_1$). The maximum braking force $F_{M1}$ depends on the biasing force of the biasing member 80, and the friction coefficient between the brake disc 86 and the armature 82 and between the brake disc 86 and the end plate 84.

Next, the controller 12 starts the second brake operation of the second braking mechanism 64 at the time point $t_2$ when the time has elapsed from the time point $t_1$. More specifically, the controller 12 transmits a command to the brake power source at the time point $t_2$ so as to control the voltage V applied to the exciting coil 78 of the second braking mechanism 64 from $V_2$ to zero, as illustrated in section (b) in FIG. 6. Note that, in the present embodiment, the voltages $V_1$ and $V_2$ are set $V_1 = V_2$.

As a result, the excitation of the exciting coil 78 of the second braking mechanism 64 is canceled, whereby the brake disc 86 is held between the armature 82 and the end plate 84. In this way, as illustrated in section (d) in FIG. 6, the second braking mechanism 64 applies the maximum braking force $F_{M2}$ to the output shaft 56a of the second motor 56 at the time point $t_2$ (in a precise sense, after a small amount of time has elapsed from the time point $t_2$).

In the present embodiment, the maximum braking force $F_{M2}$ of the second braking mechanism 64 is substantially the same as the maximum braking force $F_{M1}$ of the first braking mechanism 62. That is, the first brake operation of the first braking mechanism 62 and the second brake operation of the second braking mechanism 64 are substantially the same brake operation.

In this way, the controller 12 controls the excitation timings of the exciting coils 78 of the first braking mechanism 62 and the second braking mechanism 64 in order to start the first brake operation and the second brake operation with the timings shifted from each other by the time τ. Subsequently, the controller 12 continues the first brake operation and the second brake operation to brake the output shaft 54a by the first braking mechanism 62 and the brake the output shaft 56a by the second braking mechanism 64, and whereby continues to brake the articulated shaft 74.

Note that the time τ of the difference between the start time point $t_1$ of the first brake operation and the start time point $t_2$ of the second brake operation can be predetermined by the user to be an optimum value (e.g., τ=100 msec) using an experimental method, in consideration of an allowable coasting-running distance of the articulated shaft 74 and peaks $L_1$ and $L_2$ (FIG. 7) of load L applied to the movable element at the time of braking.

Figure 7:
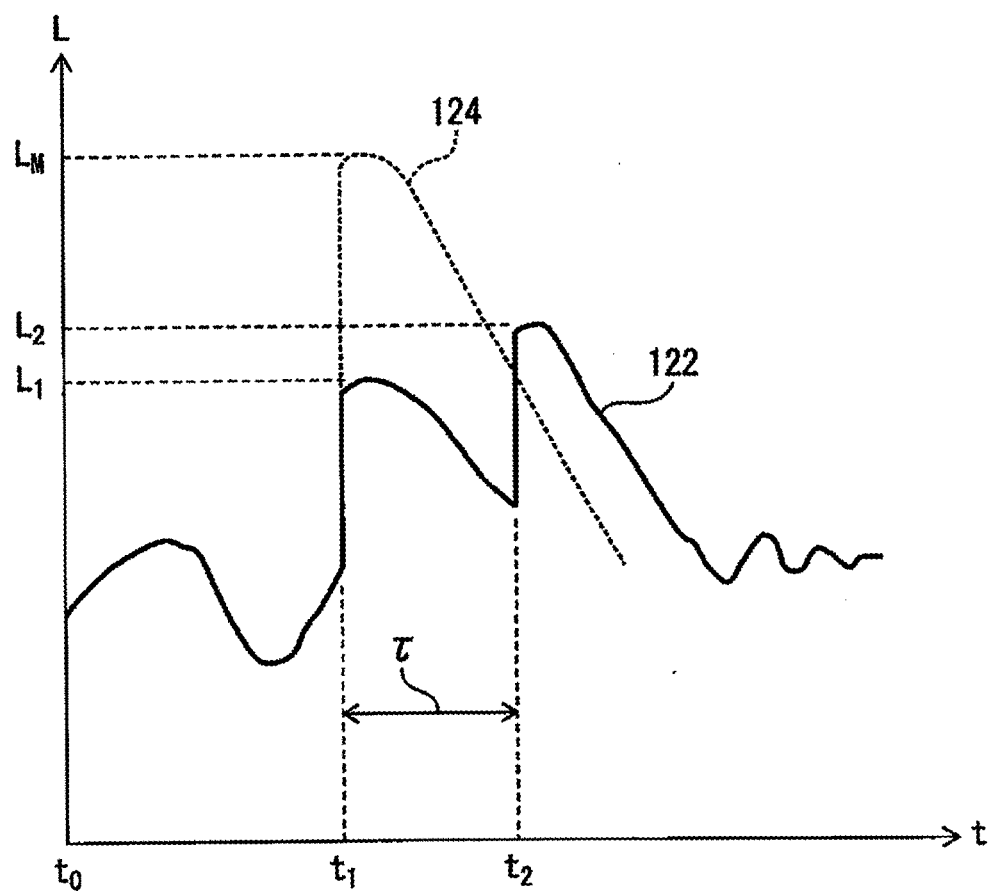
FIG. 7 is a graph of a relationship between a load and a time, the load applied to a robot mechanical section by a first brake operation and a second brake operation.

FIG. 7 shows a graph of the relationship between the time t and the load L applied to the component (e.g., the wrist 22) of the robot mechanical section 14 by the first brake operation and the second brake operation. The solid line 122 in FIG. 7 indicates the relationship between the time t and the load L when the first brake operation and the second brake operation are carried out with the timings depicted in FIG. 6. On the other hand, the dashed line 124 in FIG. 7 indicates, as a comparison, the relationship between the time t and the load L when the first brake operation and the second brake operation are started at the same time.

As indicated by the solid line 122, when the first brake operation and the second brake operation are carried out with the timings depicted in FIG. 6, a load $L_1$ is applied to the component of the robot mechanical section 14 at the start of the first brake operation (i.e., the time point $t_1$), and subsequently, a load $L_2$ is applied thereto at the start of the second brake operation (i.e., the time point $t_2$), On the other hand, when the first braking mechanism 62 and the second braking mechanism 64 are simultaneously activated at the time point $t_1$ as indicated by the dashed line 124, a load $L_M$ significantly greater than the loads $L_1$ and $L_2$ is applied to the component of the robot mechanical section 14 at the time point $t_1$.

In this way, according to the brake control illustrated in FIG. 6, it is possible to disperse and reduce the peak of the load L (i.e., peaks $L_1$ and $L_2$) applied to the robot mechanical section 14 by the first brake operation and the second brake operation. Therefore, the load applied to the robot mechanical section 14 during activation of the first braking mechanism 62 and the second braking mechanism 64 can be reduced.

Further, by suitably setting the above-described time τ in consideration of the allowable coasting-running distance of the articulated shaft 74, it is also possible to make the coasting-running distance of the articulated shaft 74 due to braking of the first braking mechanism 62 and the second braking mechanism 64 be within an allowable range, even when the start timings of the first brake operation and the second brake operation are shifted from each other by the time τ.

In addition, since the two braking mechanisms 62 and 64 apply the braking forces to the articulated shaft 74 in cooperation with each other, it is possible to firmly brake the articulated shaft 74 even when a large torque is applied to the articulated shaft 74 due to external force or the like. Accordingly, the component of the robot mechanical section 14 can be stably stopped.

Further, according to the present embodiment, since the load applied to the robot mechanical section 14 upon activation of the braking mechanisms 62 and 64 can be reduced, it is possible to reduce the weight of a material (e.g., a casting material) used for the robot mechanical section 14. Due to this, the end effector 28 having a greater weight can be attached to the robot mechanical section 14, and the manufacturing cost can be reduced.

Figure 8:
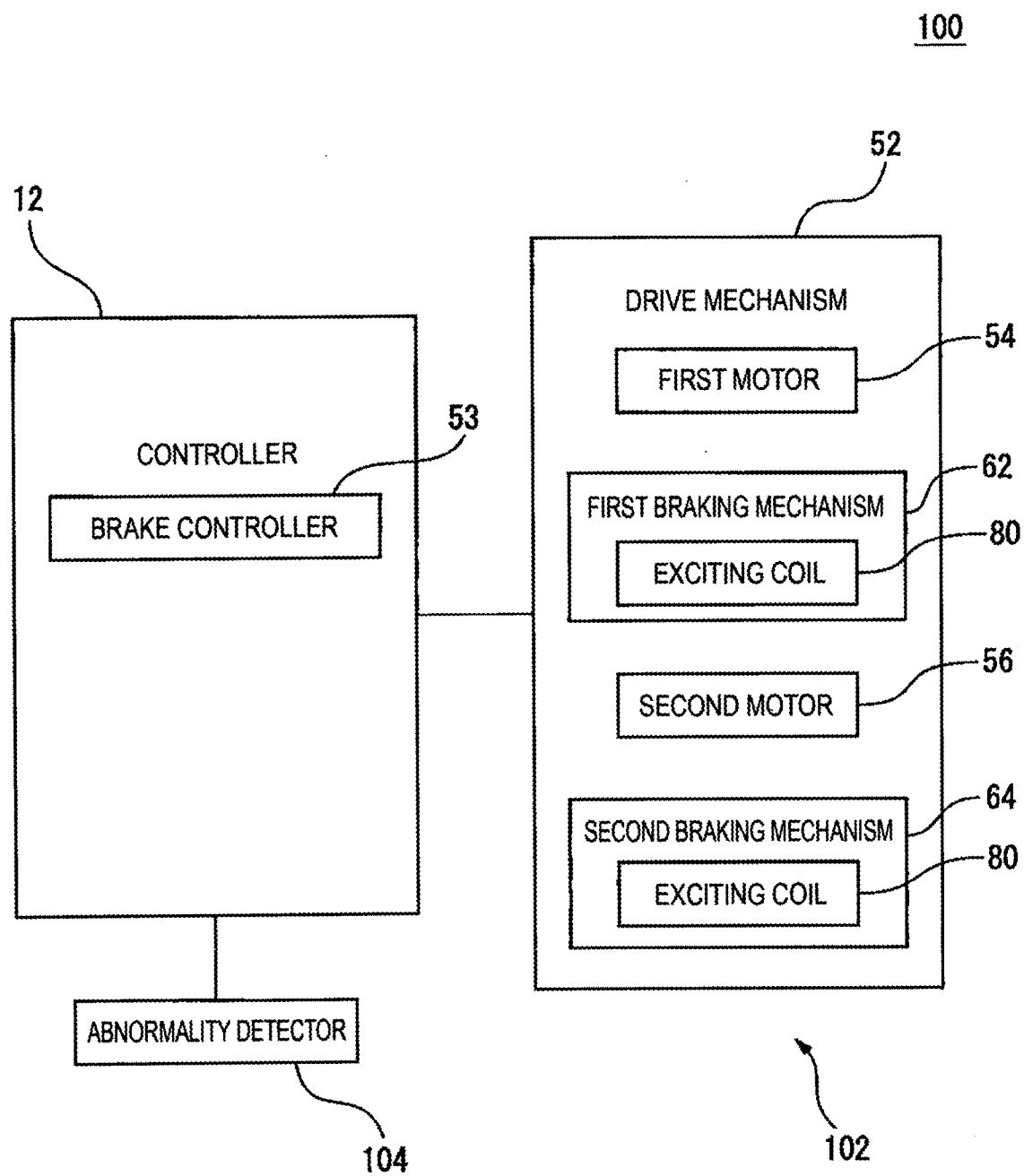
FIG. 8 is a block diagram of a robot according to another embodiment.

Next, a robot 100 according to another embodiment is described with reference to FIG. 8. The robot 100 differs from the above-described robot 10 in a drive device 102. More specifically, the drive device 102 further includes an abnormality detector 104, in addition to the above-described drive mechanism 52 and the brake controller 53.

The abnormality detector 104 is configured to detect whether or not an abnormality to emergently stop the articulated shaft 74 has occurred. As an example, the abnormality detected by the abnormality detector 104 is an electric power failure of the motor power source for supplying electric power to the first motor 54 or the second motor 56.

In this case, the abnormality detector 104 monitors the output voltage of the motor power source (or the supply voltage to the motor power source), and detects the occurrence of electric power failure when the output voltage (or the supply voltage) becomes lower than a predetermined threshold value.

As another example, the abnormality detected by the abnormality detector 104 is a difference between a command value (e.g., a position command) to the first motor 54 or the second motor 56 and a feedback value (e.g., a position feedback value) from a sensor exceeding a predetermined threshold value. The sensor includes e.g. an encoder configured to detect the rotation number of the first motor 54 or the second motor 56, or a position sensor configured to detect the position of the articulated shaft 74 (or movable element).

In this case, the abnormality detector 104 acquires the feedback value from the sensor, and compares the feedback value with the command value to the first motor 54 or the second motor 56. Then, the abnormality detector 104 detects that an abnormality in operation of the robot mechanical section 14 has occurred when the difference between the feedback value and the command value is equal to or greater than the predetermined threshold value.

As yet another example, the abnormality detected by the abnormality detector 104 is a person's entry into a predetermined no-entry zone. The no-entry zone is defined by a fence provided with a door, for example. In this case, the abnormality detector 104 includes a sensor capable of detecting the opening and closing of the door of the fence, and detects a person's entry into the no-entry zone upon receiving a door-opening signal from the sensor.

Alternatively, the no-entry zone is defined by an electromagnetic wave irradiated from a non-contact sensor. In this case, the abnormality detector 104 includes the non-contact sensor, and detects a crossing of the irradiated electromagnetic waves by an object. The abnormality detector 104 detects a person's entry into the no-entry zone by detecting a crossing of electromagnetic waves of the non-contact sensor by an object.

The controller 12 functions as the brake controller 53 to start the first brake operation of the first braking mechanism 62, and subsequently (after a lapse of the time τ) starts the second brake operation of the second braking mechanism 64, as illustrated in FIG. 6, when the abnormality detector 104 detects an abnormality.

According to the present embodiment, when an abnormality such as an electric power failure occurs, it is possible to emergently stop the articulated shaft 74 by the first braking mechanism 62 and the second braking mechanism 64 while reducing the peaks $L_1$ and $L_2$ of the load applied to the movable element of the robot mechanical section 14.

Note that the brake power source may include an uninterruptible power source capable of applying voltage to the exciting coil 78 even in the event of an electric power failure. In this case, it is possible to securely activate the braking mechanisms 62 and 64 even when an unexpected electric power failure occurs.

Note that the time τ between the start time point $t_1$ of the first brake operation and the start time point $t_2$ of the second brake operation may be changed on the basis of the operating state of the movable element (i.e., the articulated shaft 74) of the robot mechanical section 14.

As an example, the controller 12 changes the time τ in response to a feedback value (e.g., a speed feedback value) from the sensor. The sensor includes an encoder configured to detect the rotation number of the first motor 54 or the second motor 56, or a position sensor (or a speed sensor) configured to detect the position (or the speed) of the articulated shaft 74 (movable element).

More specifically, the time τ may be set such that, if the feedback value $\alpha_f$ satisfies $\alpha_f \leq \alpha_1$, the time τ may be set as $\tau=\tau_0$ (e.g., $\tau_0=0$), if the feedback value $\alpha_f$ satisfies $\alpha_1<\alpha_f \leq \alpha_2$, the time τ may be set as $\tau=\tau_1$ ($>\tau_0$), and if the feedback value $\alpha_f$ satisfies $\alpha_2<\alpha_f \leq \alpha_3$, the time τ may be as $\tau=\tau_2$ ($>\tau_1$). The threshold values $\alpha_1$, $\alpha_2$, and $\alpha_3$ are predetermined by the user.

According to this embodiment, if the feedback value $\alpha_f$ is a speed feedback value for example, the time τ increases as the rotation number of the first motor 54 or the second motor 56 (i.e., the speed of the articulated shaft 74 and the movable element) increases.

In this regard, if the rotation number of the first motor 54 or the second motor 56 (i.e., the speed of the articulated shaft 74 and the movable element) is amply small, the peak $L_M$ of the load L applied to the component of the robot mechanical section 14 when the first braking mechanism 62 and the second braking mechanism 64 are activated at the same time is relatively small, and thus the load L is not excessive. Therefore, in this case, by simultaneously activating the first braking mechanism 62 and the second braking mechanism 64, it is possible to reduce the coasting distance of the articulated shaft 74.

On the other hand, if the rotation number of the first motor 54 or the second motor 56 (i.e., the speeds of the articulated shaft 74 and the movable element) is large, since the load L applied to the component of the robot mechanical section 14 due to braking by the first braking mechanism 62 and the second braking mechanism 64 becomes large, it is beneficial to shift the timings of the start of the first brake operation and the second brake operation from each other, as illustrated in FIG. 6.

In this way, by changing the time τ in response to the rotation number of the first motor 54 or the second motor 56 (i.e., the speeds of the articulated shaft 74 and the movable element), it is possible to optimize the coasting distance and the load L applied to the robot mechanical section 14 over a low speed range to a high speed range.

Note that the first braking mechanism 62 and the second braking mechanism 64 may be configured such that the braking force $F_{M1}$ of the first braking mechanism 62 and the braking force $F_{M2}$ of the second braking mechanism 64 are different from each other. In other words, the first brake operation of the first braking mechanism 62 may be different from the second brake operation of the second braking mechanism 64.

For example, by making the biasing force of the biasing member 80 of the first braking mechanism 62 be different from that of the second braking mechanism 64, the braking force $F_{M1}$ of the first braking mechanism 62 can be different from the braking force $F_{M2}$ of the second braking mechanism 64.

As an example, the braking force $F_{M1}$ of the first braking mechanism 62 is set to be greater than the braking force $F_{M2}$ of the second braking mechanism 64 (i.e., $F_{M1}>F_{M2}$). In this case, the controller 12 carries out the first brake operation and the second brake operation with the timings depicted in FIG. 6, when stopping the articulated shaft 74.

That is, the controller 12 start the first brake operation of the first braking mechanism 62, that exerts the larger braking force $F_{M1}$, prior to the second brake operation of the second braking mechanism 64, that exerts the smaller braking force $F_{M2}$. Due to this configuration, the articulated shaft 74 is firstly braked by the larger braking force $F_{M1}$, which can reduce the coasting distance of the articulated shaft 74.

As another example, the braking force $F_{M1}$ of the first braking mechanism 62 is set to be smaller than the braking force $F_{M2}$ of the second braking mechanism 64 (i.e., $F_{M1} < F_{M2}$). In this case, the controller 12 carried out the first brake operation and the second brake operation with the timings depicted in FIG. 6 when stopping the articulated shaft 74.

That is, the controller 12 starts the first brake operation of the first braking mechanism 62, that exerts the smaller braking force $F_{M1}$, prior to the second brake operation of the second braking mechanism 64, that exerts the larger braking force $F_{M2}$. According to this configuration, the smaller braking force $F_{M1}$ is firstly applied to the rotating articulated shaft 74, which results in reduction of the load L applied to the component of the robot mechanical section 14.

Alternatively, the first motor 54 may be configured to be a master motor which outputs greater power (i.e., rotational force), while the second motor 56 may be configured to be a slave motor which outputs lower power than the first motor 54. In this case, the controller 12 may execute the first brake operation and the second brake operation with the timings depicted in FIG. 6 when stopping the articulated shaft 74.

Accordingly, in this case, the first brake operation for the first motor 54 as the master motor of higher output is started prior to the second brake operation for the second motor 56 as the slave motor of lower output.

Alternatively, the second motor 56 may be configured to be a master motor, while the first motor 54 may be configured to be a slave motor configured to output lower power than the second motor 56. In this case, the controller 12 may execute the first brake operation and the second brake operation with the timings depicted in FIG. 6 when stopping the articulated shaft 74.

Accordingly, in this case, the first brake operation for the first motor 54 as the slave motor of lower output is started prior to the second brake operation for the second motor 56 as the master motor of higher output.

Note that, in the above-described embodiments, the braking mechanisms 62 and 64 have structures as illustrated in FIG. 4. However, the braking mechanism 62, 64 may have any type of brake structure capable of braking the output shaft 54a, 56a. For example, the braking mechanism 62, 64 may include a pneumatic or hydraulic cylinder, and generate braking force by the cylinder.

In the above-described embodiments, the braking mechanism 62 and 64 are provided at the output shafts 54a and 56a so as to brake the output shafts 54a and 56a. However, the braking mechanisms 62 and 64 may be provided at the input shaft 72 of the input gear stage 58 so as to brake the input shaft 72. Alternatively, the braking mechanisms 62 and 64 may be provided at the articulated shaft 74 so as to directly brake the articulated shaft 74.

In the above-described embodiments, the drive device 50, 102 includes a total of two motors 54 and 56. However, the drive device 50, 102 may include a total of "n" motors ("n" is an integer equal to or greater than 3). In this case, the drive device 50, 102 may include a total of "n" braking mechanisms respectively provided at the output shafts of the "n" motors, and configured to brake the respective output shafts, wherein the controller 12 may execute brake operations of the total of "n" braking mechanisms such that the timings of the starts of the brake operations of the braking mechanisms are shifted from one another.

In the above-described embodiments, the two motors 54 and 56 cooperate to rotate the articulated shaft 74. However, the two motors 54 and 56 may cooperate to linearly move an operation shaft. The brake controller 53 may be provided as a separate element from the controller 12. In this case, the brake controller 53 may be comprised of a computer including a processor, a storage, and the like.

While the present disclosure has been described through specific embodiments, the above-described embodiments do not limit the invention as defined by the appended claims.

The invention claimed is:

1. A drive device in which a plurality of motors cooperate to drive one operation shaft, the drive device comprising:
   a first motor and a second motor;
   a first braking mechanism provided at the first motor, and configured to carry out a first brake operation on the operation shaft;
   a second braking mechanism provided at the second motor, and configured to carry out a second brake operation on the operation shaft; and
   a brake controller configured to control the first braking mechanism and the second braking mechanism so as to continue the first brake operation and the second brake operation after starting the first brake operation prior to the second brake operation.

2. The drive device of claim 1, further comprising an abnormality detector configured to detect whether or not an abnormality to emergently stop the operation shaft has occurred,
   wherein the brake controller is configured to start the first brake operation when the abnormality detector detects the abnormality.

3. The drive device of claim 1, wherein each of the first braking mechanism and the second braking mechanism includes:
   a brake disc;
   a magnetic armature configured to selectively contact and separate from the brake disc; and
   an exciting coil configured to cause the armature to contact or separate from the brake disc,
   wherein the brake controller is configured to control an excitation timing of the exciting coil.

4. A robot comprising:
   a robot mechanical section including an articulated shaft as the operation shaft; and
   a drive device according to claim 1.

* * * * *